(12) United States Patent
Ben-Shalom et al.

(10) Patent No.: US 7,551,245 B2
(45) Date of Patent: Jun. 23, 2009

(54) DISPLAY PANEL AND LARGE DISPLAY USING SUCH DISPLAY PANEL

(75) Inventors: Amir Ben-Shalom, Modin (IL); Noritaka Egami, Tokyo (JP); Zenichirou Hara, Toyko (JP)

(73) Assignees: Magink Display Technologies Ltd., Mevasseret Zion (IL); Mitsubishi Denki Kabushiki Kaisha, Tokyo (JP)

( * ) Notice: Subject to any disclaimer, the term of this patent is extended or adjusted under 35 U.S.C. 154(b) by 399 days.

(21) Appl. No.: 10/536,311

(22) PCT Filed: Nov. 26, 2003

(86) PCT No.: PCT/IL03/01003

§ 371 (c)(1),
(2), (4) Date: Jun. 22, 2005

(87) PCT Pub. No.: WO2004/051609

PCT Pub. Date: Jun. 17, 2004

(65) Prior Publication Data

US 2006/0097957 A1    May 11, 2006

(30) Foreign Application Priority Data

Nov. 29, 2002  (JP) .............................. 2002-347294
Oct. 30, 2003  (IL) ..................................... 158676

(51) Int. Cl.
*G02F 1/133*  (2006.01)
*G02F 1/1335* (2006.01)
*G09G 5/00*   (2006.01)

(52) U.S. Cl. ........................ 349/73; 349/149; 345/1.3

(58) Field of Classification Search ............... 349/51, 349/73, 149–153; 345/1.1–3.1, 18
See application file for complete search history.

(56) References Cited

U.S. PATENT DOCUMENTS 5,673,091 A * 9/1997 Boisdron et al. ............... 349/58

(Continued)

OTHER PUBLICATIONS

Greene, "Manufacturing of Large Wide-View Angle Seamless Tiled AMLCDs for Business and Consumer Applications", International Display Manufacturing Conference, Jul. 5, 2000, pp. 191-193.

(Continued)

*Primary Examiner*—David Nelms
*Assistant Examiner*—Jessica M Merlin
(74) *Attorney, Agent, or Firm*—Pearl Cohen Zedek Latzer, LLP

(57) ABSTRACT

A tiling of multiple display panels having reduced seam widths (gap) therebetween using a plurality of single edge connect display panels, wherein for each display panel: interconnect lines in the lateral direction are formed on a front plate; input portions of the interconnect lines are routed on an area where a sealing portion is formed and are extended outwardly from the bottom edge of the display panel; the area where the sealing portion is formed is a non-display area of the display panel on the front plate that is bonded to a rear plate with a seal material; and the input portions routed the bottom side of the front plate are extended outwardly from the bottom edge of the rear plate. The input portions are formed in part on the rear plate and electrical connection is established by bonding the front plate and the rear plate via through holes.

17 Claims, 13 Drawing Sheets

U.S. PATENT DOCUMENTS

| | | | | |
|---|---|---|---|---|
| 5,805,117 | A * | 9/1998 | Mazurek et al. | 345/1.3 |
| 5,851,411 | A | 12/1998 | An et al. | |
| 5,870,163 | A * | 2/1999 | Watanabe et al. | 349/149 |
| 6,407,785 | B1 * | 6/2002 | Yamazaki | 349/113 |
| 6,473,147 | B1 * | 10/2002 | Nakahara et al. | 349/153 |
| 2002/0021399 | A1 * | 2/2002 | Higuchi et al. | 349/149 |
| 2002/0044251 | A1 | 4/2002 | Togashi et al. | |
| 2002/0054006 | A1 * | 5/2002 | Tsuyuki et al. | 345/87 |
| 2002/0118320 | A1 * | 8/2002 | Bayrle et al. | 349/73 |
| 2002/0145697 | A1 * | 10/2002 | Hoshina | 349/151 |

OTHER PUBLICATIONS

Supplementary European Search Report for Application No. EP 03 77 5771.

* cited by examiner

DISPLAY PANEL AND LARGE DISPLAY USING SUCH DISPLAY PANEL

CROSS-REFERENCE TO RELATED APPLICATIONS

This application is a National Phase Application of PCT International Application No. PCT/IL2003/001003, International Filing Date Nov. 26, 2003, claiming priority of Japanese Patent Application No. 2002-347294, filed Nov. 29, 2002 and Israeli Patent Application No. 158676, filed Oct. 30, 2003.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to display panels and a large display employing such display panels, and especially to a reduction of seam width in a matrix arrangement of display panels.

More specifically, the present invention relates to a Liquid Crystal Display (LCD) made of a plurality of respectively laterally arranged (tiled) display modules wherein the modules utilize a single edge connector to access both X-axis and Y-axis addressable portions therein.

BACKGROUND OF THE INVENTION

At the beginning of the manufacture of large displays, which are constructed by arranging display elements in a matrix, a technique of arranging monochromatic CRTs (Cathode Ray Tubes) in a matrix has been developed and put into practical use. Later, display elements having a plurality of pixels have been developed, which have dramatically improved resolution. In recent years, instead of CRTs, a technique of arranging LEDs (Light Emitting Diodes) or a technique of arranging display panels such as LCDs (Liquid Crystal Displays) or PDPs (Plasma Display Panels) have been developed. This expands the applicability of large displays to various uses such as outdoor use for high resolution, indoor use for high brightness, and use of lightweight and slim displays for building wall surfaces.

The CRT has a thick sealing portion to ensure strength for atmospheric pressure and hermeticity, since its inside is kept at a high vacuum or it is sealed containing a low pressure gas. Also, the CRT is structurally difficult to reduce its weight and thickness. Accordingly, arranging CRTs in a matrix results in a large display with apparent seam width. The technique of arranging CRTs in a matrix, therefore, has problems of having a structural limitation to a reduction of the seam width and producing a quite heavy large display as a whole because of heavy weights of individual display elements.

The technique of arranging LEDs, on the other hand, can produce a high-resolution large display because LEDs are nearly point sources and they can be arranged with high density on a flat plate. Arranging LED elements with high density increases resolution (device density), but causes a problem of cost increase.

Hence, there is a longstanding need in the art for resolving the aforementioned problems; such as a technique of arranging display panels (such as LCDs or PDPs) including a large number of pixels in a matrix. More particularly, the need presents itself where the display panels are lighter in weight than CRTs and have lower unit cost per pixel than LEDs. Specifically, the need is most critical in the manufacture of large displays, where a technique of arranging display panels in a matrix is more advantageous.

Hereinbelow, a large display constructed by arranging display panels in a matrix is described. The display panels such as LCDs or PDPs each have front and rear plates on which electrodes and interconnect lines are formed to control respective pixels arranged in a matrix. A space between the front and rear plates needs to be cut off from the external environment, for which the front and rear plates have sealing portions of enough width at their peripheries. The interconnect lines for controlling pixels are extended outwardly of the sealing portions for supply of signals and the like from outside.

In the construction of a large display by a matrix arrangement of display panels, it is necessary to make visually imperceptible seams between display panels. However, because of the presence of sealing portions and extended interconnect portions at the peripheries of the front and rear plates, making visually imperceptible seams between display panels is difficult. Japanese Patent Application Laid-open No. 10-96911 (pp. 5-8, FIGS. 9-34) discloses a method of manufacturing a high-density large-screen liquid crystal display having visually imperceptible seams. This manufacturing method employs, for example, etching or laser techniques for cutting and superfine polishing techniques, which are used for lens working, for improving the uniformity of a cutting plane.

Also, Japanese Patent Application Laid-open No. 10-111517 (pp. 34, FIGS. 1-4) shows an example of a structure in which a film plate is utilized instead of a glass plate so that extraction electrode portions can be bent at a right angle at the edges of display panels. In this reference, therefore, a space required for extraction electrode can be reduced.

In constructing a large display by arranging display panels in a matrix, seams between adjacent display panels are apparent because of the presence of sealing portions formed at the peripheries of the front and rear plates and interconnect portions extended outwardly of the sealing portions. For example, where g1 is the width of the sealing portion and g2 is the gap between display panels, a seam width G is at least 2×g1+g2. The gap g2 between display panels is the sum of the width of the interconnect portion extended outwardly from the display panel and a gap required to avoid contact of interconnect lines with an adjacent display panel. The gap g2 is thus necessary to seal the edge of one display panel from which interconnect lines are extended outwardly and the edge of an adjacent display panel.

In general, interconnect lines in a row direction are extended outwardly from the right edge of the display panel, and interconnect lines in a column direction are extended outwardly from the bottom edge of the display panel. Thus, for either horizontal or longitudinal sealing of display panels, the gap g2 is necessary between the display panels, thereby making apparent seams between the display panels. To reduce this gap g2, it is necessary to reduce the number of edges from which interconnect lines are extended outwardly. However, the conventional techniques disclosed in the above references have no mention of this point.

Further, the outward extension of interconnect lines from two edges has a problem of reliability; for example, in the assembly of a large display, adjacent display panels may be in contact with each other, thereby giving damage to interconnect lines

BRIEF SUMMARY OF THE INVENTION

The aforesaid longstanding needs are significantly addressed by embodiments of the present invention, which specifically relates to a display panel and to a large display using such display panels. The instant apparatus is especially useful in indoor and outdoor advertising and informational media presentation wherein there exists a longstanding need for a less-expensive electronically-driven large-format dynamic graphic display; composed of a tiling of display panels, modules, or the likes.

An object of the present invention is to provide a display panel that can be easily interconnected to an electronics module, which drives graphic contents of the display. Another object of the present invention is to provide display panels arranged in a matrix with reduced seam width (especially, gap) therebetween, and to provide a large display employing such display panels.

According to one aspect of the present invention, a display panel includes pixels, and first and second interconnect lines. The pixels are arranged in a matrix in first and second directions. The first interconnect lines extend in the first direction and are connected to the pixels. First input portions of the first interconnect lines are routed on an area of the display panel where a sealing portion is formed and are extended outwardly from an edge of the display panel from which second input portions of the second input portions are extended outwardly. The second interconnect lines extend in the second direction and are connected to the pixels.

The display panel according to the present invention can reduce seam widths between adjacent bonded display panels.

According to another aspect of the present invention, a large display is constructed by arranging display panels in a matrix. The display panels each include pixels arranged in a matrix in first and second directions, first interconnect lines which are connected to the pixels and extend in the first direction, and second interconnect lines which are connected to the pixels and extend in the second direction. First input portions of the first interconnect lines are routed on an area of the display panel where a sealing portion is formed and are extended outwardly from an edge of the display panel from which second input portions of the second interconnect lines are extended outwardly.

The large display according to the present invention has visually imperceptible seams between display panels, as compared with a conventional large display.

These and other objects, features, aspects and advantages of the present invention will become more apparent from the following detailed description of the present invention when taken in conjunction with the accompanying drawings.

Notices

Numbers, alphabetic characters, and roman symbols are designated in the following sections for convenience of explanations only, and should by no means be regarded as imposing particular order on any method steps. Likewise, the present invention will forthwith be described with a certain degree of particularity, however those versed in the art will readily appreciate that various modifications and alterations may be carried out without departing from either the spirit or scope, as hereinafter claimed.

In describing the present invention, explanations are presented in light of currently accepted Scientific, Engineering or Technological theories/models. Such theories and models are subject to changes, both adiabatic and radical. Often these changes occur because representations for fundamental component elements are innovated, because new transformations between these elements are conceived, or because new interpretations arise for these elements or for their transformations. Therefore, it is important to note that the present invention relates to specific technological actualization in embodiments. Accordingly, theory or model dependent explanations herein, related to these embodiments, are presented for the purpose of teaching, the current man of the art or the current team of the art, how these embodiments may be substantially realized in practice. Alternative or equivalent explanations for these embodiments may neither deny nor alter their realization.

BRIEF DESCRIPTION OF THE DRAWINGS

In order to understand the invention and to see how it may be carried out in practice, embodiments including the preferred embodiment will now be described, by way of non-limiting example only, with reference to the accompanying drawings. Furthermore, a more complete understanding of the present invention and the advantages thereof may be acquired by referring to the following description in consideration of the accompanying drawings, wherein.

DETAILED DESCRIPTION OF THE INVENTION

Hereinbelow, the present invention will be described in detail with reference to the drawings showing preferred embodiments thereof.

First Preferred Embodiment

Figure 1:
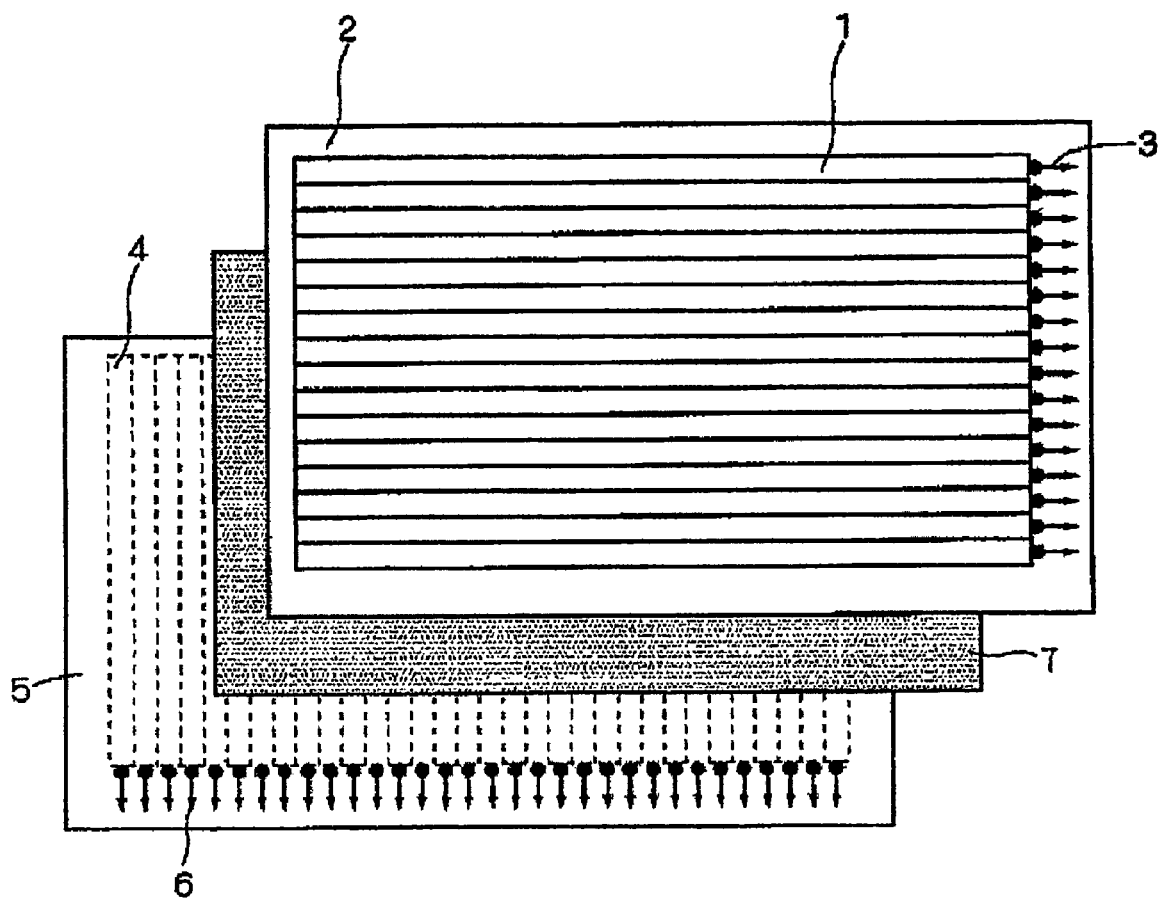
FIG. 1 is a schematic view showing a general display panel structure.

This preferred embodiment relates to a structure of display panels for use in a large display. Examples of the display panels include, for example, LCDs (Liquid Crystal Displays), PDPs (Plasma Display Panels) and EL (Electroluminescent) panels. These display panels have a common basic structure. FIG. 1 shows a schematic view of a general display panel structure. Interconnect lines 1 extending in the lateral direction (or row direction) are formed on a front plate 2, each having an input portion 3 for receiving a signal. Interconnect lines 4 extending in the longitudinal direction (or column direction) are formed on a rear plate 5, each having an input portion 6 for receiving a signal.

The front plate 2 and the rear plate 5 sandwich a display layer 7 therebetween and are sealed at their peripheries with a seal material. Thereby the display layer (or display space) 7 is isolated from the external environment. The interconnect lines 1 and 4 supply signals to pixel electrodes for driving the display layer 7. The input portions 3 and 6 of the interconnect lines 1 and 4 are extended outwardly of a sealing portion in order to receive signals from outside. The front plate 2 and the rear plate 5 are bonded so that their respective surfaces on which the interconnect lines 1 and 4 are formed are in face-to-face relationship with each other. In the case of LCDs, for example, the display layer 7 is filled with a liquid crystal and in the case of PDPs, it is nearly vacuum-sealed.

Thus, in order to drive pixels arranged in a matrix, the display panels each require the interconnect lines 1 and 4 which are connected to the pixels and extend in two directions, i.e., row and column directions. For this, as has already been described, the input portions 3 and 6 are always extended outwardly from two or more edges of the display panel.

Figure 2:
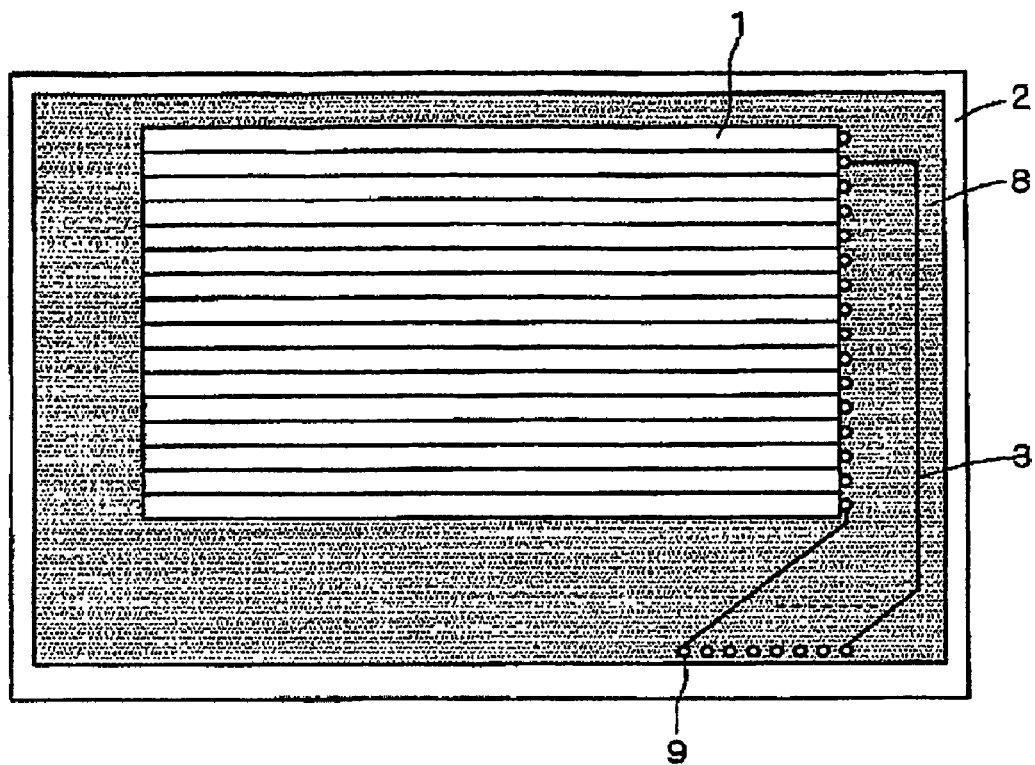
FIG. 2 is a plan view of a front plate according to a first preferred embodiment of the present invention.

In a display panel structure according to this preferred embodiment, on the other hand, the input portions 3 and 6 are extended outwardly from one edge of the display panel. This structure is described hereinbelow. FIG. 2 shows a plan view of the front plate 2 according to this preferred embodiment. The lateral interconnect lines 1 are formed on the front plate 2. Generally, the interconnect lines 1 are formed of ITO (Indium Tin Oxide). More specifically, ITO is deposited on the front plate 2 by, for example, sputtering and then formed into a predetermined interconnect pattern by lithographic techniques, thereby forming the interconnect lines 1. Alternatively, a technique of directly forming an interconnect pattern by print processes may be used for formation of the interconnect lines 1. The input portions 3 of the interconnect lines 1 have conventionally been extended outwardly from the right edge of the display panel (as viewed in FIG. 2 and hereinafter, the same can be said of the other drawings). On the other hand, in this preferred embodiment, the input portions 3 are routed on an area 8 where a sealing portion is formed (this area is referred to also as a sealing area 8) and are extended outwardly from the bottom edge of the display panel. Here, the (sealing) area 8 where a sealing portion is formed is a non-display area of the display panel on the front plate 2 which is bonded to the rear plate 5 with a seal material.

Figure 3:
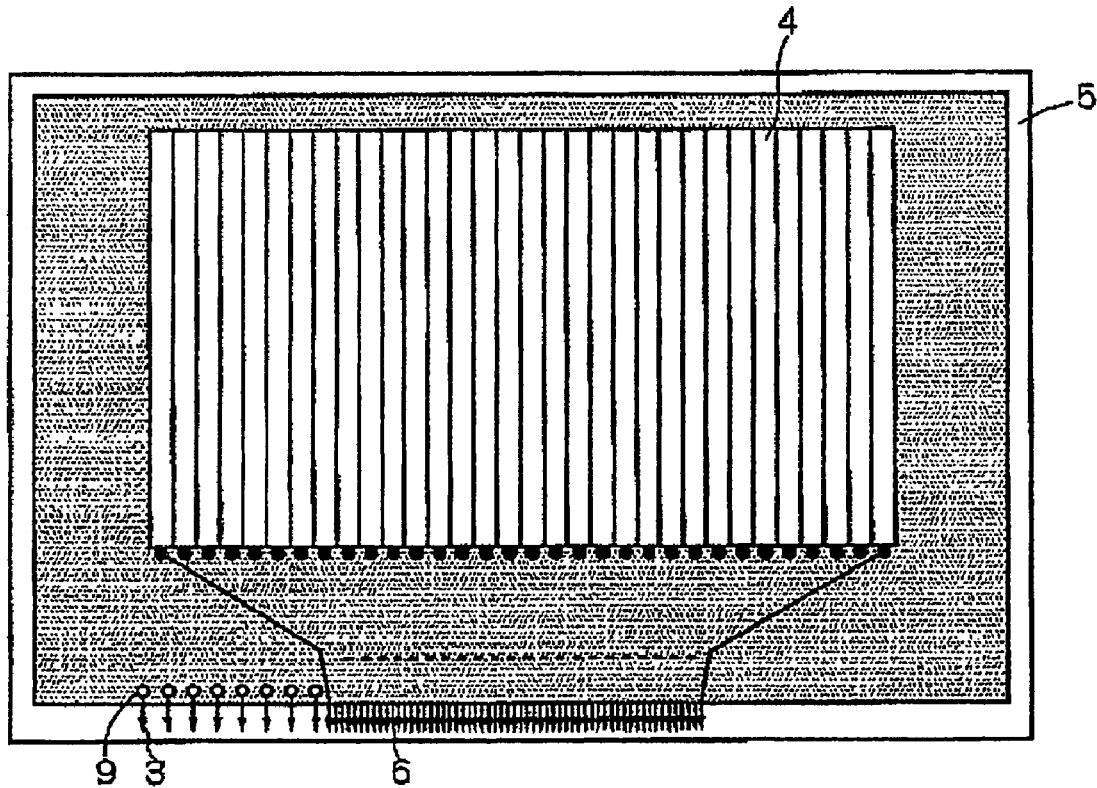
FIG. 3 is a plan view of a rear plate according to the first preferred embodiment of the present invention.

FIG. 3 shows a plan view of the rear plate 5 according to this preferred embodiment. The longitudinal interconnect lines 4 are formed on the rear plate 5. Generally, the interconnect lines 4 are also formed of ITO. The input portions 6 of the interconnect lines 4 are extended outwardly from the bottom edge of the rear plate 5 as in the conventional technique. Alternatively, the display panel may be simply configured such that the front plate 2 having its input portions 3 extended outwardly from the bottom edge is bonded to the rear plate 5 having its input portions 6 extended outwardly from the bottom edge. However, the structures of the front plate 2 and the rear plate 5 shown in FIGS. 2 and 3 are not like that.

The input portions 3 of the front plate 2 shown in FIG. 2, which are routed to the bottom side, are extended outwardly from the bottom edge of the rear plate 5. Thus, the input portions 3 are formed in part on the rear plate 5 shown in FIG. 3 and electrical connection is established by bonding the front plate 2 and the rear plate 5. In FIGS. 2 and 3, for the electrical connection of the input portions 3 on the front and rear plates 2 and 5, through holes 9 are formed in the sealing portions, corresponding to the input portions 3. Since the input portions 3 are formed in part on the rear plate 5, the input portions 6 of the interconnect lines 4 need to be extended outwardly from a portion of the bottom edge other than the left portion. Here, since the front plate 2 and the rear plate 5 are bonded to each other, the left side of the rear plate 5 in FIG. 3 faces the right side of the front plate 2 in FIG. 2. In the example of FIG. 3, therefore, the input portions 6 are collected at a central portion of the bottom edge and extended outwardly therefrom.

In the above display panel structure, the input portions 3 and 6 of the interconnect lines 1 and 4 can be extended outwardly from the same bottom edge of the display panel. This can reduce the gap between adjacent display panels on the right side thereof from which the input portions 3 of the interconnect lines 1 are conventionally extended outwardly. Further, since the area 8 for routing the input portions of the interconnect lines is a sealing portion which is also necessary in the conventional structure, there is no need to provide a new area for routing the input portions. Accordingly, arranging display panels of this preferred embodiment in a matrix results in a large display having visually imperceptible seams, as compared with conventional large displays.

So far, this preferred embodiment has described the case where the lateral interconnect lines 1 are formed on the front plate 2 and the longitudinal interconnection lines 4 are formed on the rear plate 5. However, it is to be understood that the present invention is not limited thereto and is also applicable to the case where the longitudinal interconnect lines 4 are formed on the front plate 2 and the lateral interconnect lines 1 are formed on the rear plate 5 or the case where the lateral and longitudinal interconnect lines 1 and 4 are both formed on the rear plate 5. Further, while in this preferred embodiment the input portions 3 are routed on the right side of the front plate 2 to the bottom side, the present invention is not limited thereto. In fact, the input portions 3 may be routed on the left side of the front plate 2 to the bottom side or the input portions 3 and 6 may be routed to the top side. Furthermore, in this preferred embodiment, the input portions 3 routed on the sealing area 8 are formed on the front plate 2. However, the important point of the present invention is the effective use of existing sealing portions for routing of the input portions 3; therefore, the input portions 3 may be routed through a space between the sealing portions, instead of being routed on the sealing portions.

Second Preferred Embodiment

Figure 4:
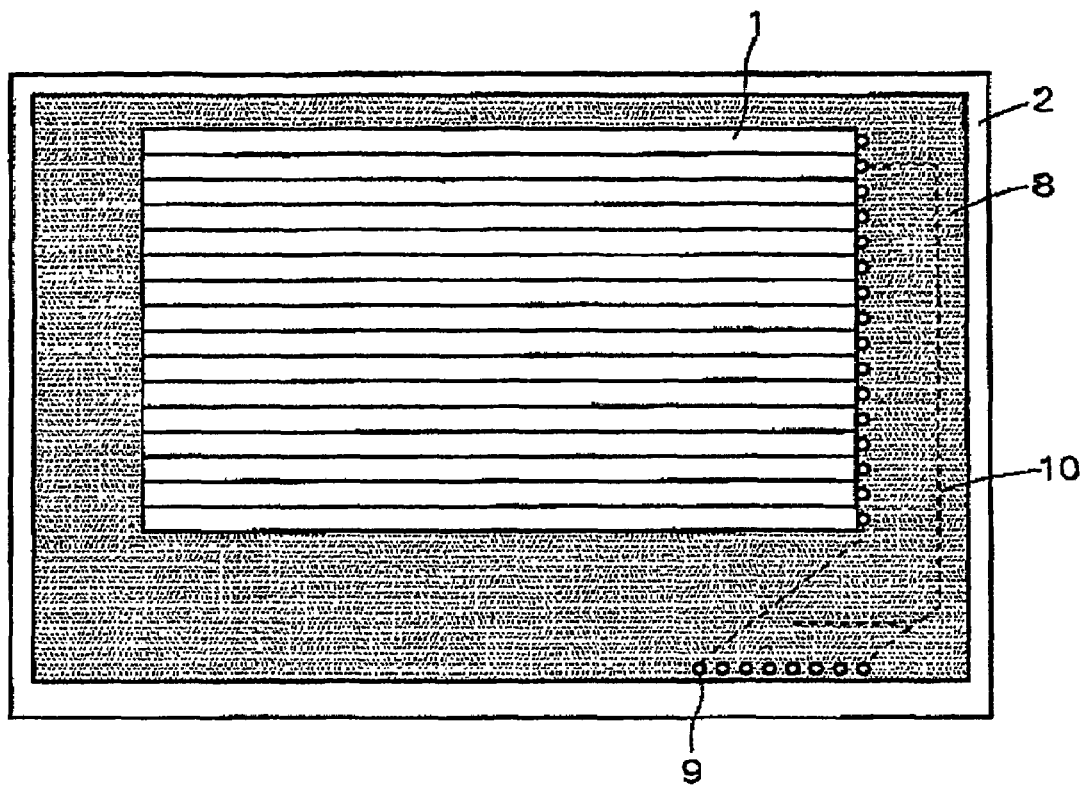
FIG. 4 is a plan view of a front plate according to a second preferred embodiment of the present invention.

FIG. 4 shows a plan view of a front plate according to this preferred embodiment. The structure shown in FIG. 4 is basically identical to that shown in FIG. 2. Thus, only different part of the structure is described hereinbelow. The input portions 3 of the interconnect lines 1 are generally formed of ITO on the front plate 2. This preferred embodiment provides a structure in which low resistance films 10 are deposited on the input portions 3 of ITO. Here, Al (aluminum), Cr (Chromium) or Al—Cr is employed as the material of the low resistance films 10. The low resistance films 10 are formed by depositing the material by, for example, sputtering and then forming it into a predetermined interconnect pattern by photolithographic techniques.

The input portions 3 routed to the bottom side of the front plate 2, instead of being extended outwardly from the right edge of the front plate 2 as in the conventional technique, require long-distance interconnection. This increases the interconnect resistance of the input portions 3 and may cause a disturbance in the waveform of a drive pulse which is inputted for driving pixels, thereby affecting display quality. In this preferred embodiment, in order to reduce the interconnect resistance of the input portions 3, a wiring material (such as Al or Cr) having lower resistance than materials such as ITO is deposited on the input portions 3.

This preferred embodiment can thus reduce the interconnect resistance of the input portions 3 and allow display of high-quality images without disturbing the waveform of the input drive pulse. It is noted here that, since the basic structure of this preferred embodiment is identical to that of the first preferred embodiment, this preferred embodiment can also achieve the same effects as described in the first preferred embodiment.

Third Preferred Embodiment

Figure 5:
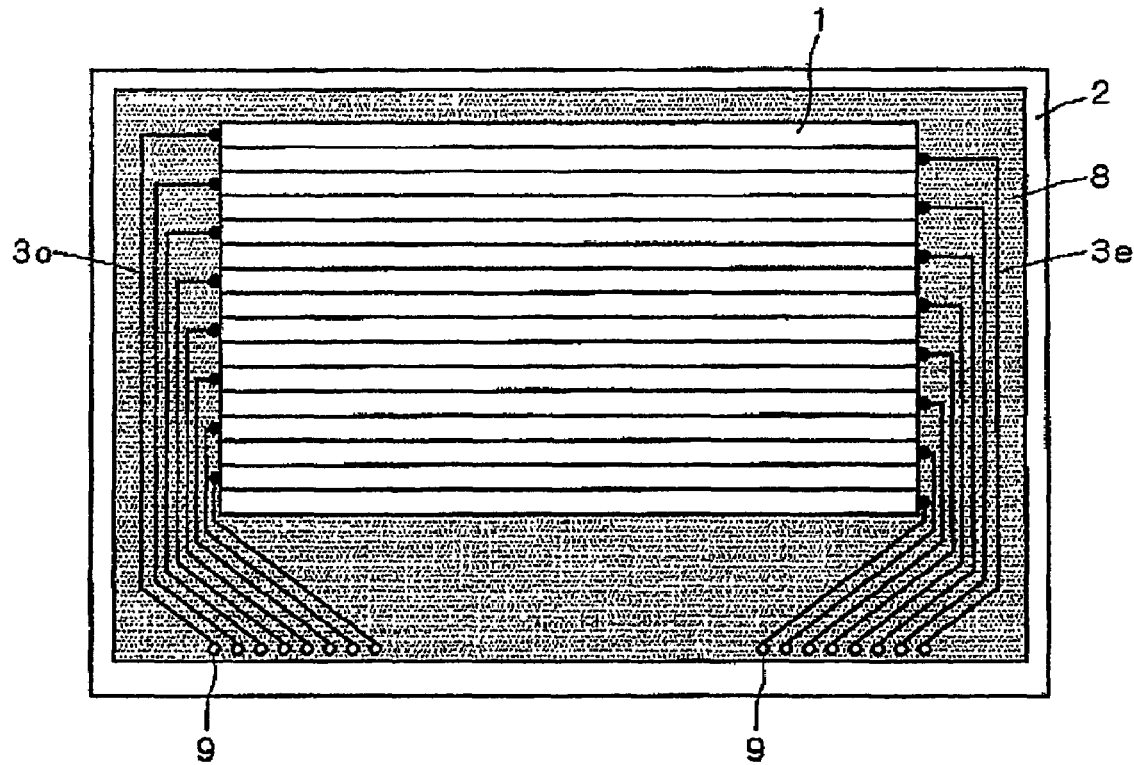
FIG. 5 is a plan view of a front plate according to a third preferred embodiment of the present invention.

FIG. 5 shows a plan view of a front plate according to this preferred embodiment. The structure shown in FIG. 5 is basically identical to that shown in FIG. 2. Thus, only different part of the structure is described hereinbelow. The lateral interconnect lines 1 are generally formed of ITO on the front plate 2. In the first preferred embodiment, the input portions 3 of the interconnect lines 1 are routed only on the right side of the front plate 2. In this preferred embodiment, on the other hand, the input portions 3 of the interconnect lines 1 in even rows (hereinafter also referred to as "even input portions 3e") are routed on the right side of the front plate 2, whereas the input portions 3 of the interconnect lines 1 in odd rows (hereinafter also referred to as "odd input portions 3o) are routed on the left side of the front plate 2. Also in this preferred embodiment, the input portions 3 are routed on the sealing area 8.

In this preferred embodiment, also, the input portions 3 routed to the bottom side of the front plate 2 are extended outwardly from the bottom edge of the rear plate 5. Thus, the input portions 3 are formed in part on the rear plate 5 and electrical connection is established by bonding the front plate 2 and the rear plate 5 (not shown). For the electrical connection of the input portions 3 on the front and rear plates 2 and 5, the through holes 9 are formed in the sealing portions, corresponding to the input portions 3. Since the input portions 3 are formed in part on the rear plate 5, the input portions 6 of the interconnect lines 4 need to be collected at a central portion of the bottom edge and extended outwardly therefrom (not shown).

In the above display panel structure, the number of input portions 3 routed on each of the right and left sides of the front plate 2 is reduced to about half that in the first preferred embodiment. Thus, the line widths of the input portions 3 can be increased to about double. Increasing the line widths of the input portions 3 reduces the interconnect resistance of the input portions 3. Accordingly, high-quality display images can be obtained without disturbing the waveform of the input drive pulse. It is noted here that, since the basic structure of this preferred embodiment is identical to that of the first preferred embodiment, this preferred embodiment can also achieve the same effects as described in the first preferred embodiment. In the present example, even if the line widths of the input portions 3 are increased, the input portions 3 can be routed within the sealing area 8 of the same size as that in the first preferred embodiment because of the reduced number of input portions 3 routed on each side.

In this preferred embodiment, the even input portions 3e are routed on the right side of the front plate 2, and the odd input portions 3o are routed on the left side of the front plate 2. However, the important point of the present invention is to reduce the number of input portions 3 routed on each side by dividing the input portions 3 into two groups, those routed on the right side and those routed on the left side. Thus, the input portions 3 are not always divided into even and odd rows. In the present invention, the input portions 3 may be divided into two parts according to other rules and then routed on each side. In another alternative, this preferred embodiment may be combined with the structure of the second preferred embodiment in which the low resistance films 10 are deposited on the input portions 3.

Figure 6:
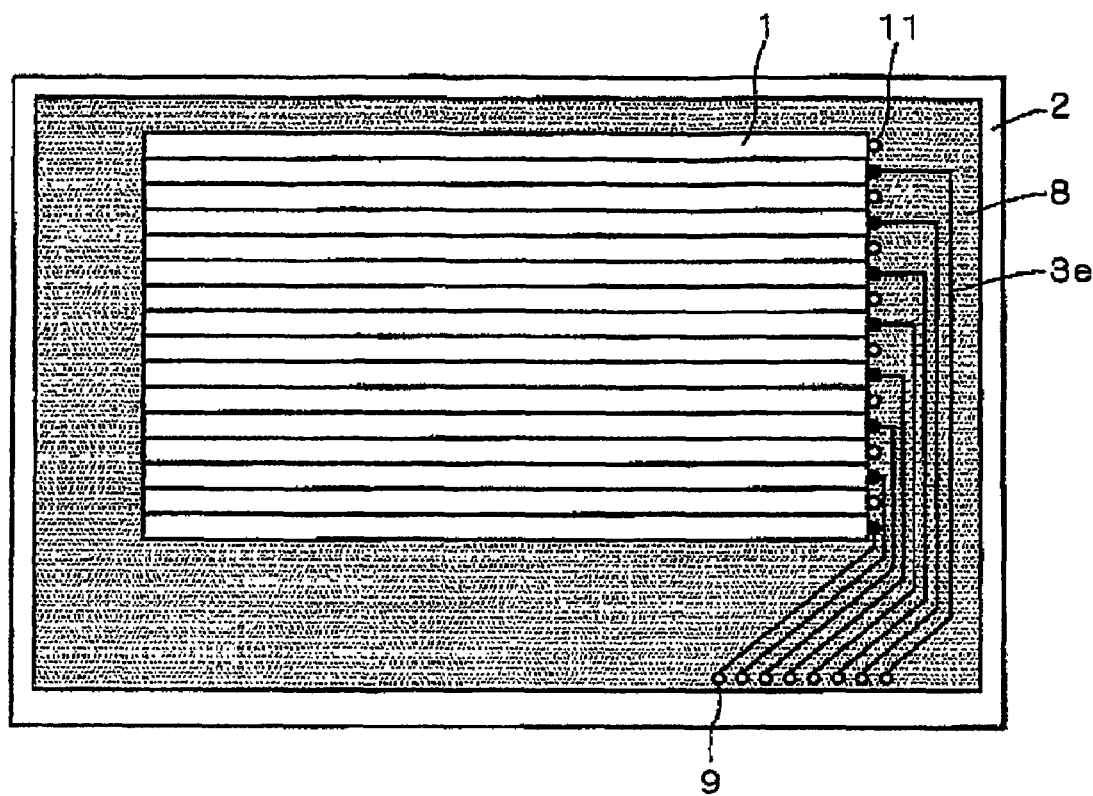
FIG. 6 is a plan view of a front plate according to a modification of the third preferred embodiment of the present invention.

A modification of this preferred embodiment provides a display panel in which the input portions 3 divided into two parts are routed on the front and rear plates 2 and 5, instead of being routed on the right and left sides of the front plate 2. FIG. 6 shows a plan view of a front plate according to the modification of this preferred embodiment. In FIG. 6, the even input portions 3e are routed on the sealing area 8 of the front plate 2. For the interconnect lines 1 in odd rows, through holes 11 are formed for electrical connection to the input portions 3 on the rear plate 5.

Figure 7:
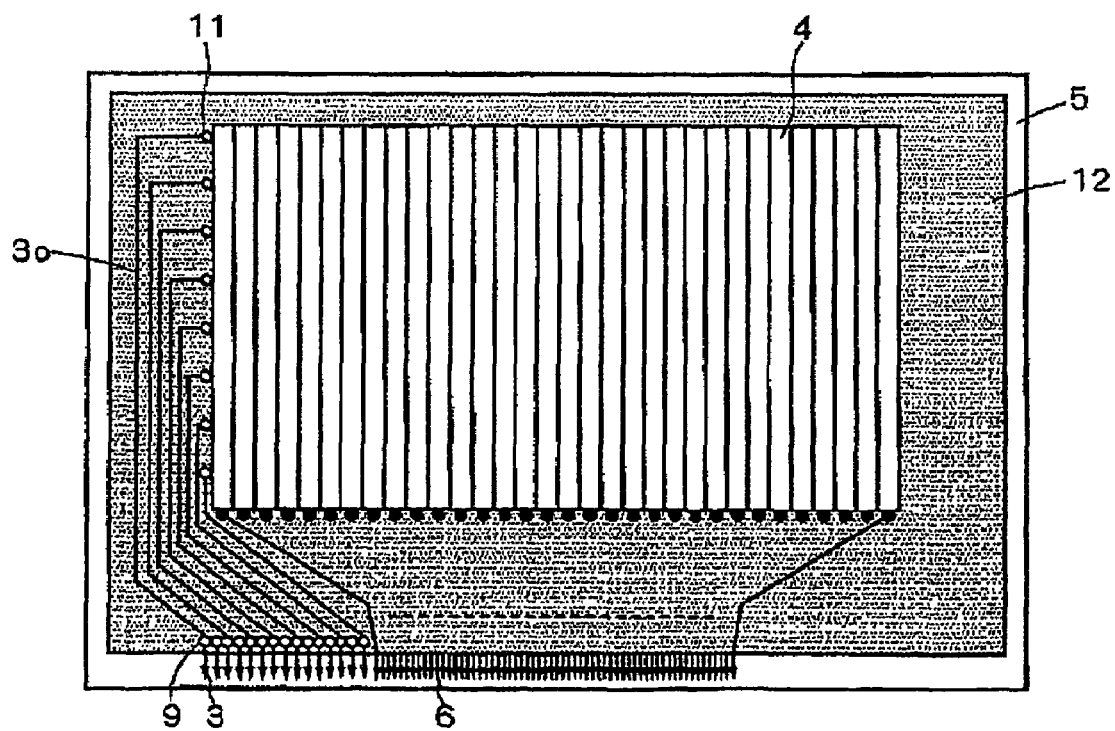
FIG. 7 is a plan view of a rear plate according to the modification of the third preferred embodiment of the present invention.

FIG. 7 shows a plan view of a rear plate according to the modification of this preferred embodiment. FIG. 7 shows the odd input portions 3o routed on an area (or sealing area) 12 of the rear plate 5 where a sealing portion is formed. Here, the (sealing) area 12 where the sealing portion is formed is a non-display area of the display panel on the rear plate 5 which is bonded to the front plate 2 with a seal material. Since the front plate 2 and the rear plate 5 are bonded to each other, the left side of the rear plate 5 in FIG. 7 faces the right side of the front plate 2 in FIG. 6. In the example of FIG. 7, the odd input portions 3o are routed on the left side of the rear plate 5.

Eventually, the odd input portions 3o are directly extended outwardly from the bottom edge of the rear plate 5, whereas the even input portions 3e are extended outwardly from the bottom edge of the rear plate 5 through the through holes 9. Also in the above display panel structure, the number of input portions 3 routed on each of the front and rear plates 2 and 5 can be reduced to about half that in the first preferred embodiment. Thus, the line widths of the input portions 3 can be reduced to about double. Increasing the line widths of the input portions 3 reduces the interconnect resistance of the input portions 3. Accordingly, this modification can also obtain images of high display quality without disturbing the waveform of the input drive pulse.

Fourth Preferred Embodiment

Figure 8:
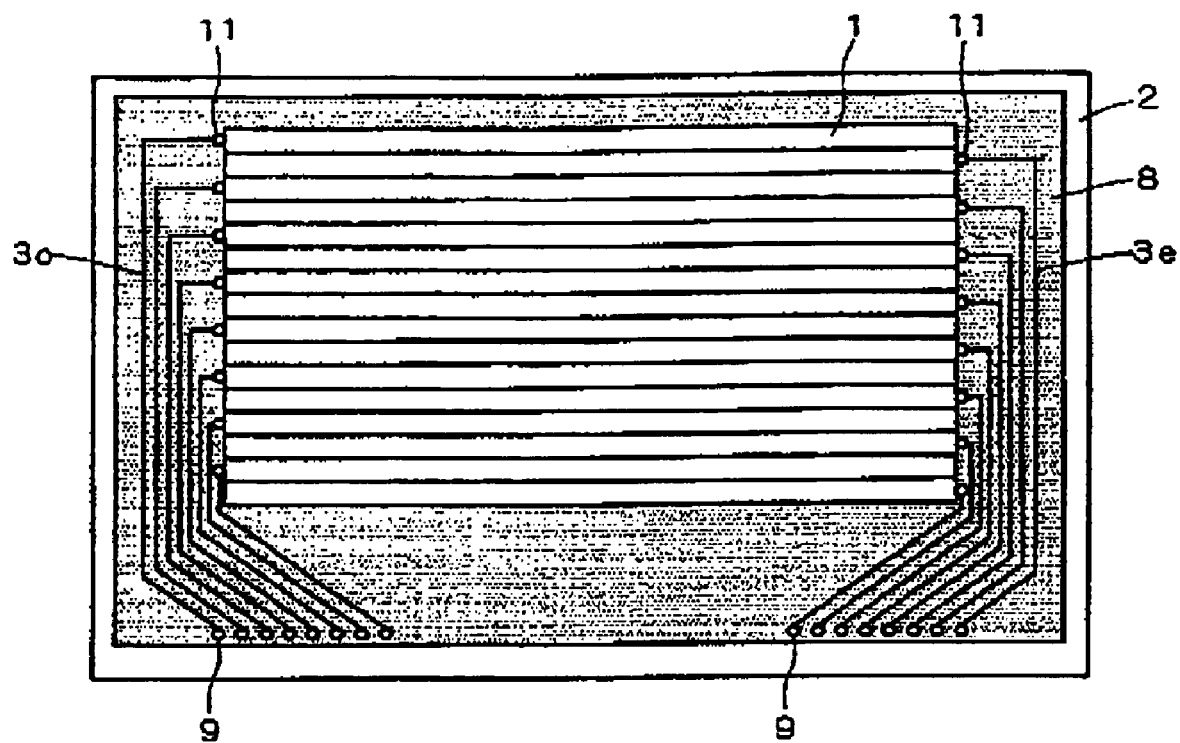
FIG. 8 is a plan view of a front plate according to a fourth preferred embodiment of the present invention.

FIG. 8 shows a plan view of a front plate according to this preferred embodiment. The structure of FIG. 8 is basically identical to that of FIG. 2. Thus, only different part of the structure is described hereinbelow. In this preferred embodiment, as in the third preferred embodiment, the even input portions 3e are routed on the right side of the front plate 2 and the odd input portions 3o are routed on the left side of the front plate 2. However, the input portions 3 in this preferred embodiment are routed not only on the sealing area 8 of the front plate 2 but also on the sealing area 12 of the rear plate 5. Thus, the through holes 11 are formed for electrical connection of the input portions 3 on the front and rear plates 2 and 5.

Figure 9:
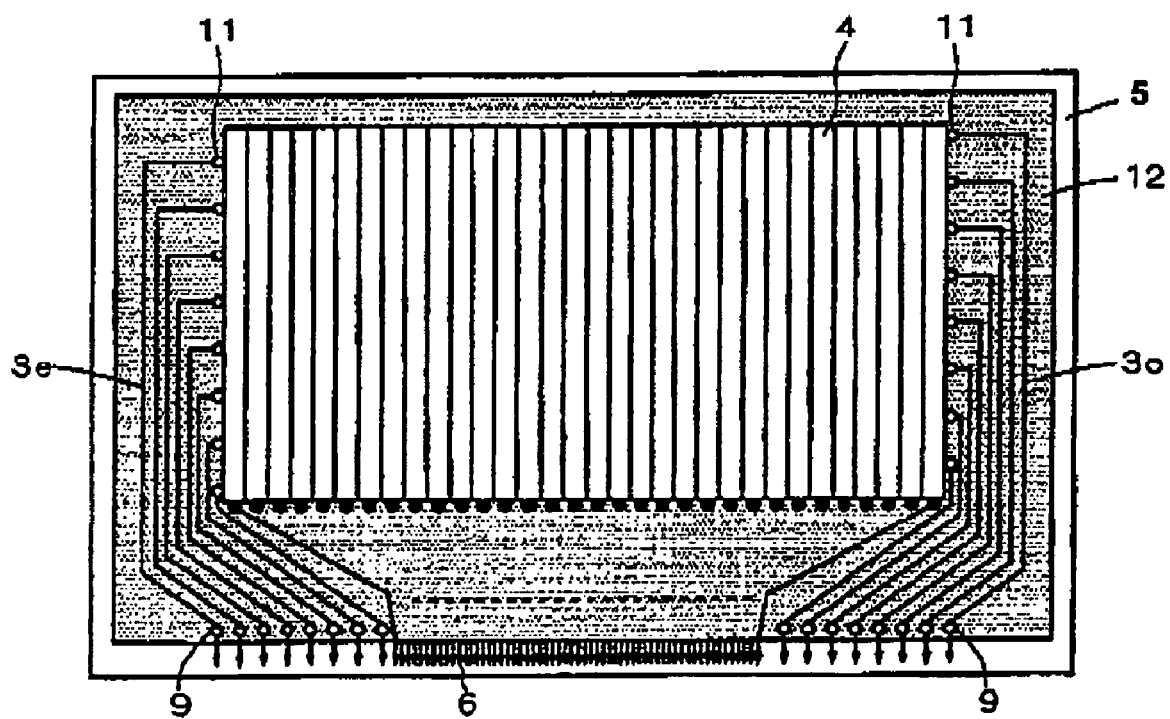
FIG. 9 is a plan view of a rear plate according to the fourth preferred embodiment of the present invention.

FIG. 9 shows a plan view of a rear plate according to this preferred embodiment. FIG. 9 shows the input portions 3 routed on the sealing area 12 of the rear plate 5. Since the front plate 2 and the rear plate 5 are bonded to each other, the left side of the rear plate 5 in FIG. 9 faces the right side of the front plate 2 in FIG. 8. Thus, on the rear plate 5, the even input portions 3e are routed on the left side and the odd input portions 3o are routed on the right side. In FIGS. 8 and 9, the front plate 2 and the rear plate 5 have the same pattern of routing of the input portions 3. However, in the present invention, the input portions 3 may be routed in different patterns on the front and rear plates 2 and 5.

The input portions 3 of the front plate 2 shown in FIG. 8 routed to the bottom side are also extended outwardly from the bottom edge of the rear plate 5. For this, the through holes 9 for providing electrical connection of the input portions 3 on the front and rear plates 2 and 5 are formed in the sealing portions, corresponding to the input portions 3. Further, since the input portions 3 are extended outwardly from the rear plate 5, the input portions 6 of the interconnect lines 4 are collected at a central portion of the bottom edge of the rear plate 5 and extended outwardly therefrom.

In the above display panel structure, the individual input portions 3 have two routes, one on the front plate 2 and one on the rear plate 5. This can reduce the interconnect resistance of the input portions 3. Accordingly, images of high display quality can be obtained without disturbing the waveform of the input drive pulse. It is noted here that, since the basic structure of this preferred embodiment is identical to that of FIG. 1, this preferred embodiment can also achieve the same effects as described in the first preferred embodiment.

In this preferred embodiment, the even input portions 3e are routed on the right side of the front plate 2 and the odd input portions 3o are routed on the left side of the Font plate 2. However, in the present invention, the input portions 3 may be divided into two parts according to different rules and then routed on each side. In another alternative, this preferred embodiment may be combined with the structure of the second preferred embodiment in which the low resistance films 10 are deposited on the input portions 3.

Fifth Preferred Embodiment

Figure 10:
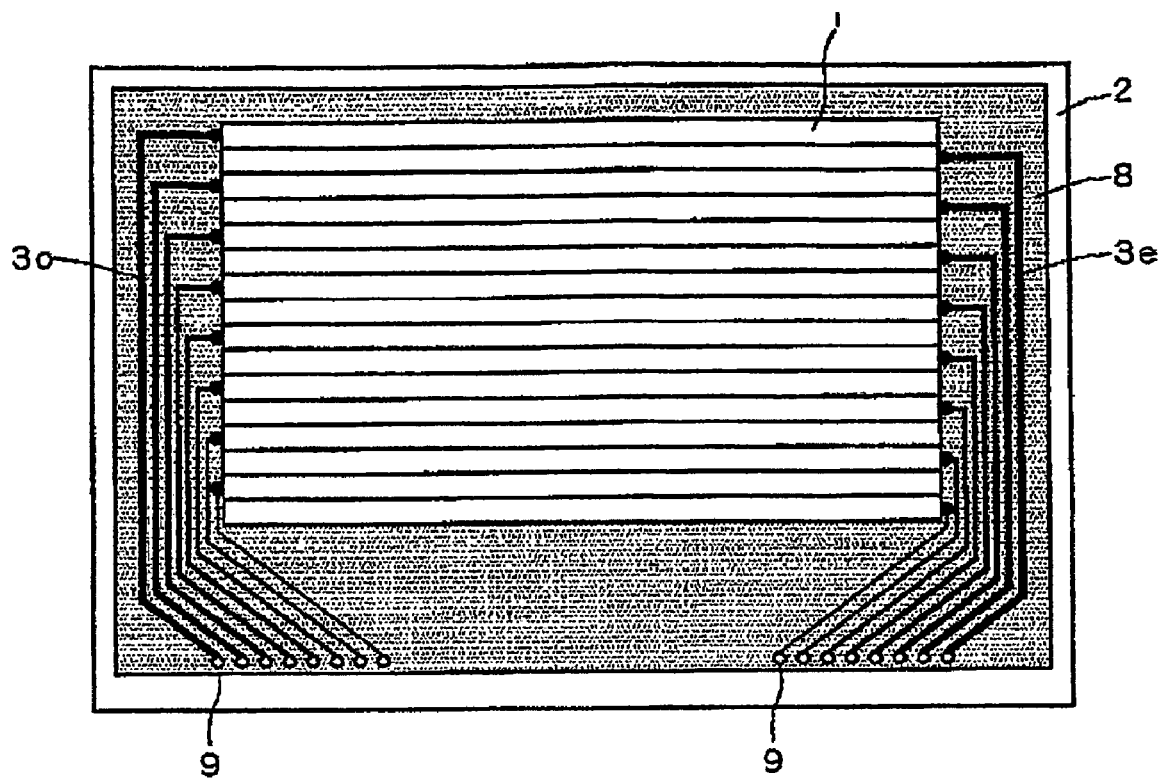
FIG. 10 is a plan view of a front plate according to a fifth preferred embodiment of the present invention.

FIG. 10 shows a plan view of a front plate according to this preferred embodiment. The structure of FIG. 10 is basically identical to that of FIG. 5. Thus, only different part of the structure is described hereinbelow. In this preferred embodiment, the line widths of the input portions 3 vary depending on the distance of routing. That is, the input portions 3 routed a longer distance have greater line widths, and the input portions 3 routed over a shorter distance have smaller line widths. However, the total of the line widths of the input portions 3 is limited by the sealing area 8 because the input portions 3 are routed within the sealing area 8.

In the above display panel structure, a difference in the interconnect resistance among the individual input portions 3 can be eliminated, which has been caused by a difference in the distance of routing. Thus, the influence of the interconnect resistance on the drive pulse waveform, which varies with the individual input portions 3, can be made uniform. Accordingly, the display panel according to this preferred embodiment can obtain images of high display quality. It is noted here that, since the basic structure of this preferred embodiment is identical to that of the first preferred embodiment, this preferred embodiment can also achieve the same effects as described in the first preferred embodiment.

Figure 11:
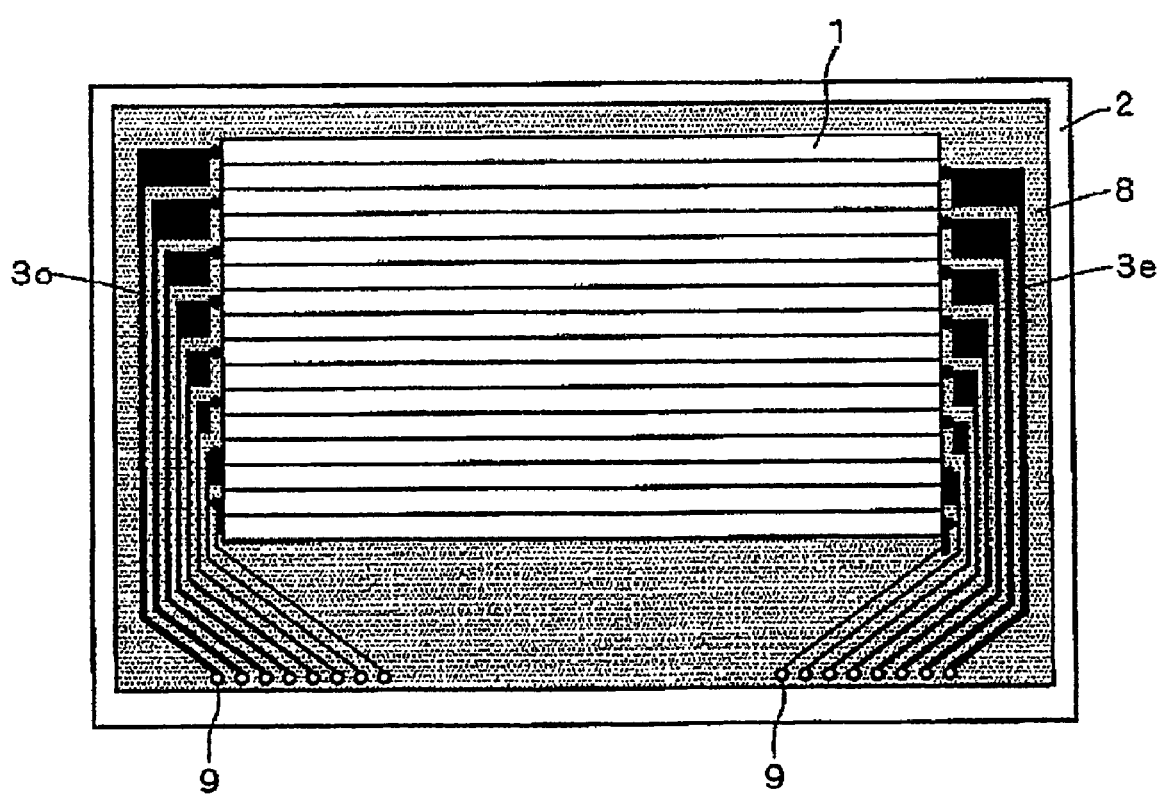
FIG. 11 is a plan view of a front plate according to a modification of the fifth preferred embodiment of the present invention.

FIG. 11 shows a plan view of a front plate according to a modification of this preferred embodiment. In FIG. 10, even when the line widths of the input portions 3 are increased, the line width of each of the input portions 3 remains unchanged from the beginning to the end. However, the line width of each input portion 3 needs not be the same from the beginning to the end but may be changed as necessary. This allows effective use of the limited width of the sealing area 8 and can reduce the interconnect resistance of the input portions 3. In FIG. 11, the line widths of the input portions 3 are increased by use of space at the start points of the input portions 3 in FIG. 10.

Sixth Preferred Embodiment

Figure 12:
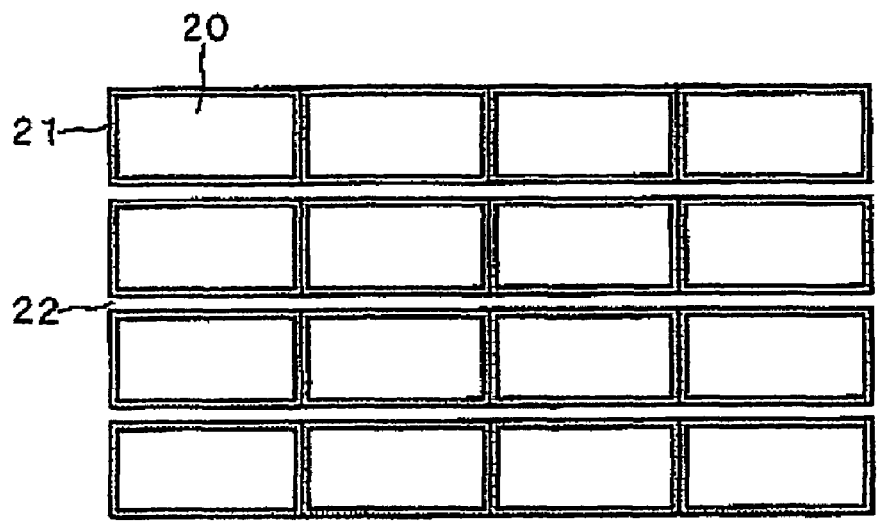
FIG. 12 is a plan view of a large display according to a sixth preferred embodiment of the present invention.
Figure 13:
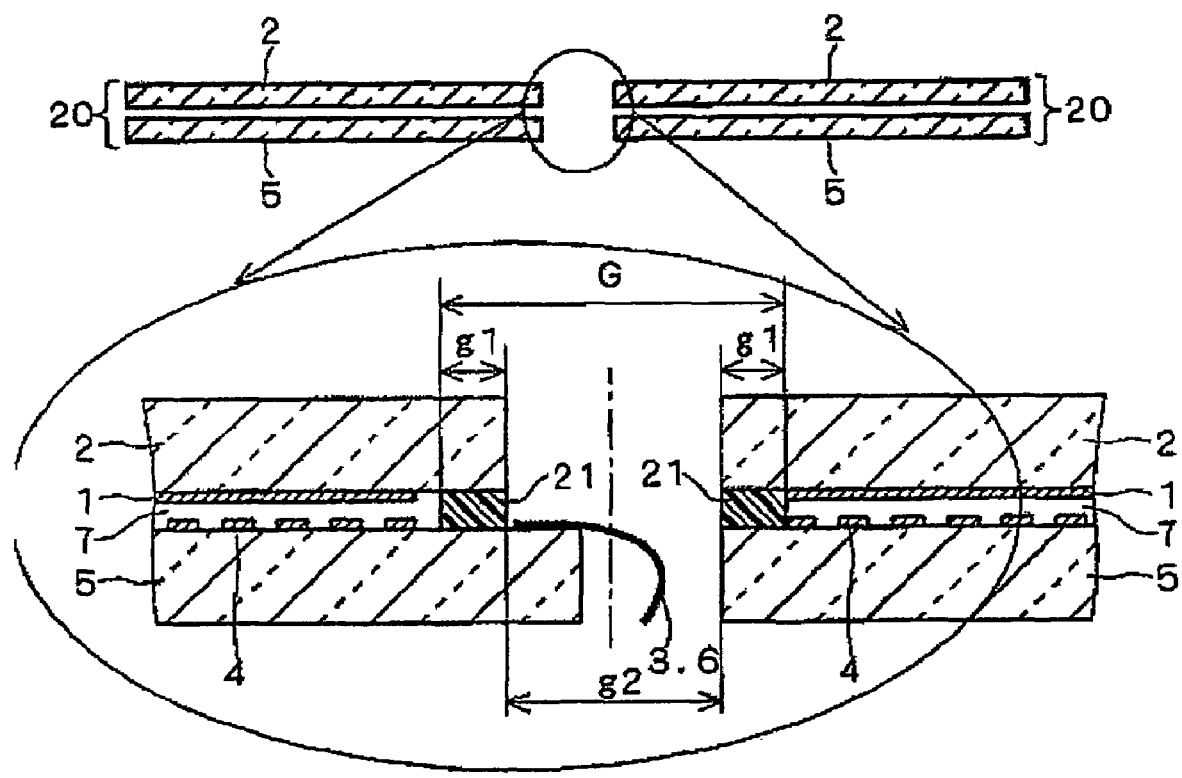
FIG. 13 is a schematic view showing a seam in tiles of display panels.

FIG. 12 shows a plan view of a large display according to this preferred embodiment. In FIG. 12, a large display is constructed by arranging display panels described in any one of the first through fifth preferred embodiments, in 4 columns and 4 rows (i.e., a total of 16 display panels). Each display panel 20 has a sealing portion 21 at the periphery. A gap 22 is required for a seam between longitudinally (or vertically) tiled display panels 20. FIG. 13 shows a schematic view of a seam between tiled display panels 20. The display panels 20 each have the sealing portion 21 with a width g1. On the side of the display panel 20 from which the input portions 3 and 6 are extended outwardly, a gap g2 is necessary for extension and to protect the input portions 3 and 6. Thus, the seam width G is g1×2+g2. In a conventional large display, the seam width G including the gap g2 between display panels is required for both longitudinal and lateral (horizontal) tiling of the display panels.

In this preferred embodiment, however, the display panels 20 to be tiled have their input portions 3 and 6 extended outwardly from only the bottom edge. Thus, no gap g2 is necessary for a seam between laterally tiled display panels 20 and accordingly, the seam width G is g1×2. Thus, the seam width G between laterally tiled display panels can be reduced as compared with that in a conventional large display, thereby resulting in a large display having visually imperceptible seams.

Figure 14:
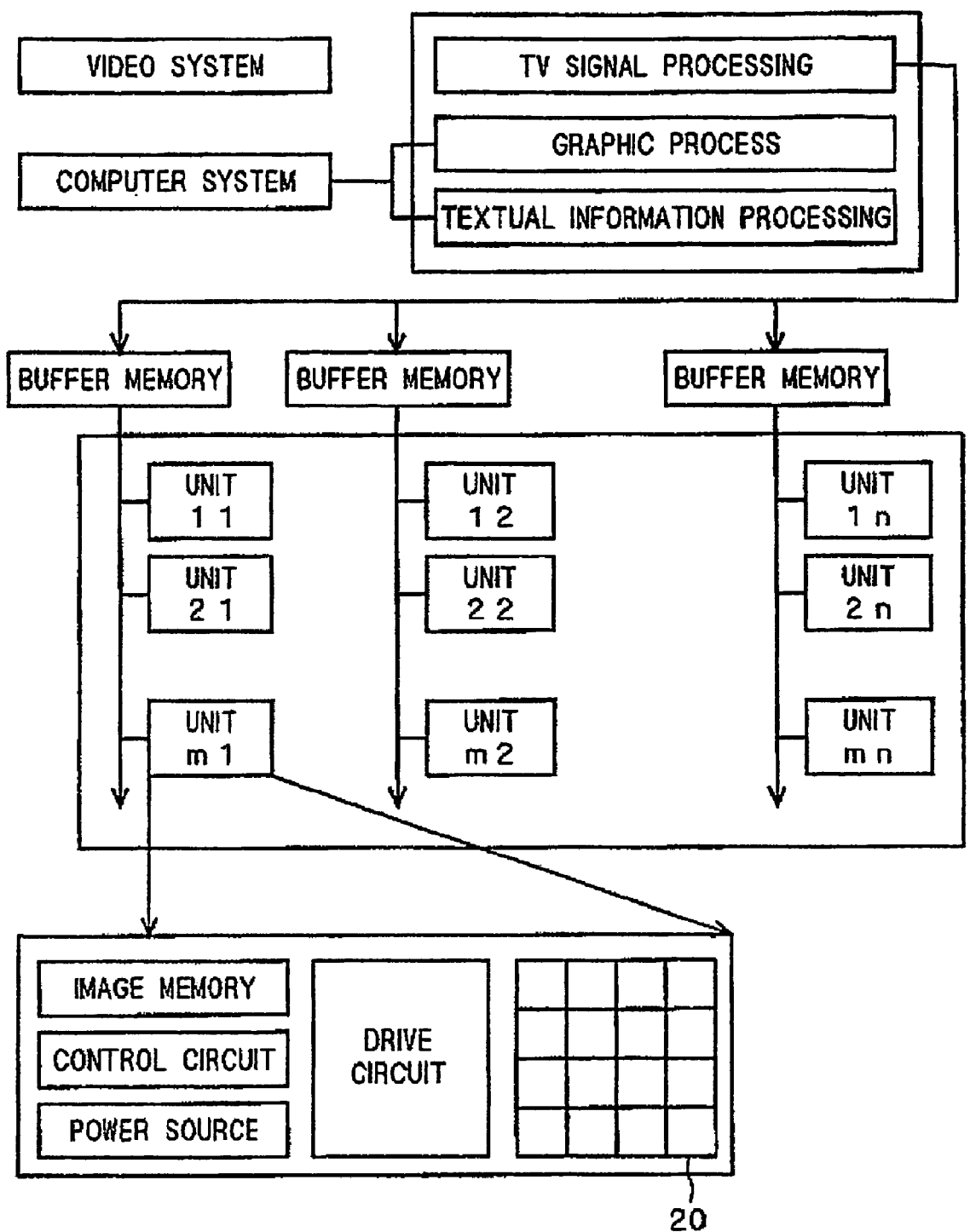
FIG. 14 is a schematic view of a structure of the large display according the sixth preferred embodiment of the present invention.

FIG. 14 shows a schematic view of a structure of the large display according to this preferred embodiment. Each unit incorporates display panels described in any one of the first through fifth preferred embodiments, a driving circuit, an image memory, a control circuit, a power source and the like. Those units are arranged in a matrix, constituting a large display. This large display is connected to a video system, a computer system and the like.

Figure 15:
FIG. 15 is a plan view showing a preferred example of the large display according to the sixth preferred embodiment of the present invention.

FIG. 15 shows one preferred example of the large display according to this preferred embodiment. The large display in FIG. 15 is constructed by arranging display panels described in any one of the first through fifth preferred embodiments in a matrix of 1 row and 4 columns (a total of 4 display panels). This preferred embodiment can provide high-definition display because display panels are tiled only in portions where seams are visually imperceptible.

Seventh Preferred Embodiment

Figure 16:
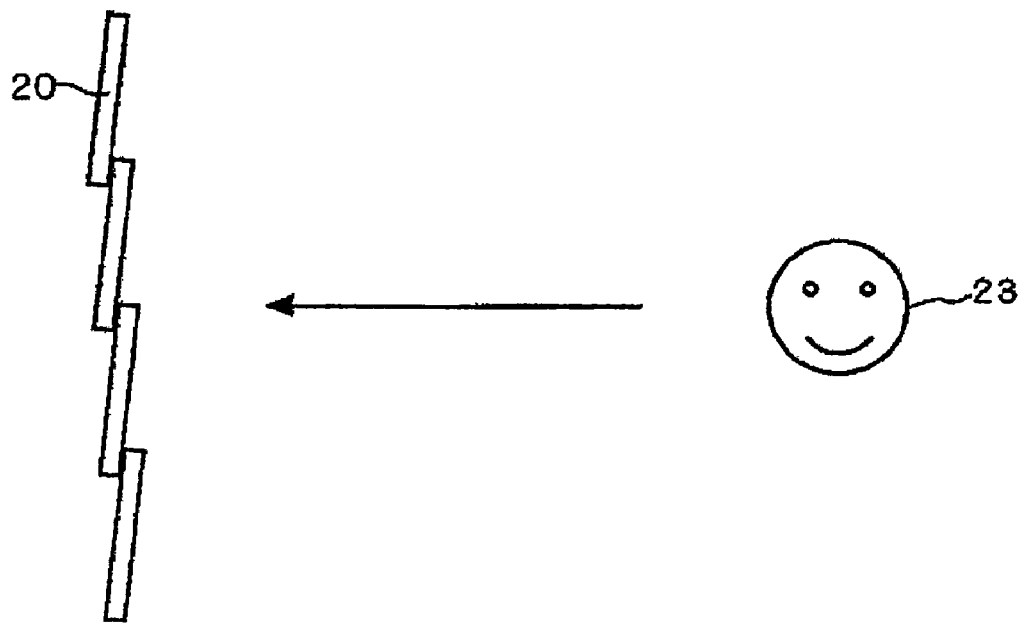
FIG. 16 is a cross-sectional view of a large display according to a seventh preferred embodiment of the present invention.

FIG. 16 shows a cross-sectional view of a large display according to this preferred embodiment. The large display in FIG. 16 is constructed by arranging display panels described in any one of the first through fifth preferred embodiments in a matrix of 4 rows and 4 columns (a total of 16 display panels). The difference from the sixth preferred embodiment is that the input portions 3 and 6 extended outwardly from the bottom edge are hidden by the display panels 20 tiled immediately below. This produces a large display panel having visually imperceptible seams between longitudinally tiled display panels, without causing damage to interconnection in the input portions 3 and 6.

Figure 17:
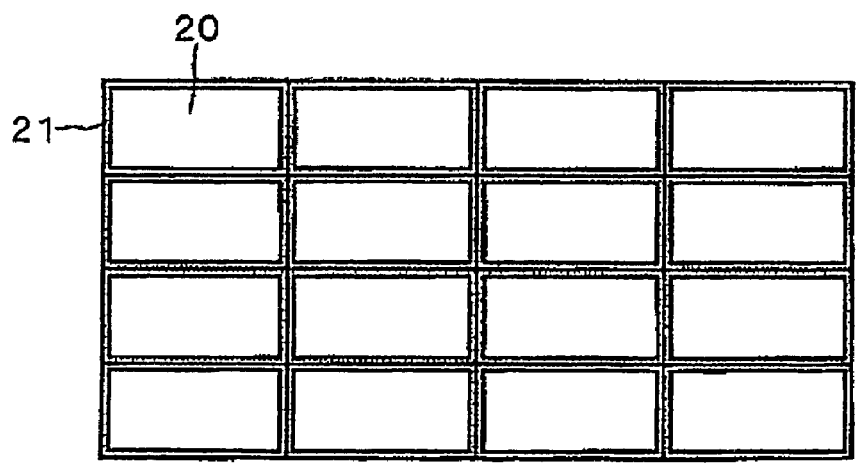
FIG. 17 is a plan view of the large display according to the seventh preferred embodiment of the present invention.

FIG. 17 shows a plan view of the large display according to this preferred embodiment. As is evident, the large display in FIG. 17, as compared with the large display shown in FIG. 12, has visually imperceptible seams between longitudinally tiled display panels 20. Using the tiling technique of the display panels 20 according to this preferred embodiment has a problem that a resultant large display has a nonflat display surface as shown in FIG. 16. However, if a viewer 23 is located at a certain distance from the large display, the influence of such a nonflat display surface upon image quality is negligible and good display can be obtained.

Eight Preferred Embodiment

Figure 18:
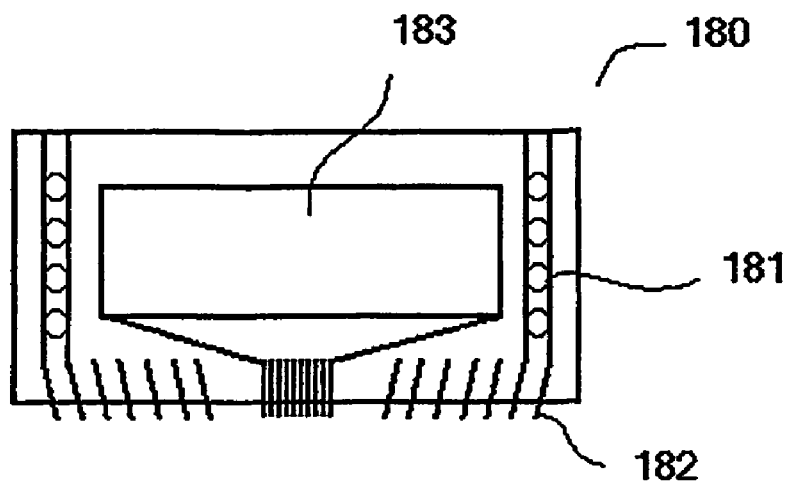
FIGS. 18-21 are respective schematic views of a display panel according to the Eighth through Eleventh Preferred Embodiments.

FIG. 18 shows a schematic view of a display panel 180 wherein at least one active illumination element 181 (e.g. electric mini-bulb of the incandescent, fluorescent or similar types; light emitting diode, or the likes) is located peripheral to the matrix 183 and each said at least one element having respective interconnect lines 182 extending outwardly from the edge of the display panel. Essentially, this embodiment provides some frontal lighting for the display panel—even if in many instances, a large part of the illumination will be at lateral angles. The key advantage here seems to be that the illumination circuitry is assembled with the panel—and can then likewise be controlled as necessary on a per panel basis.

Ninth Preferred Embodiment

Figure 19:
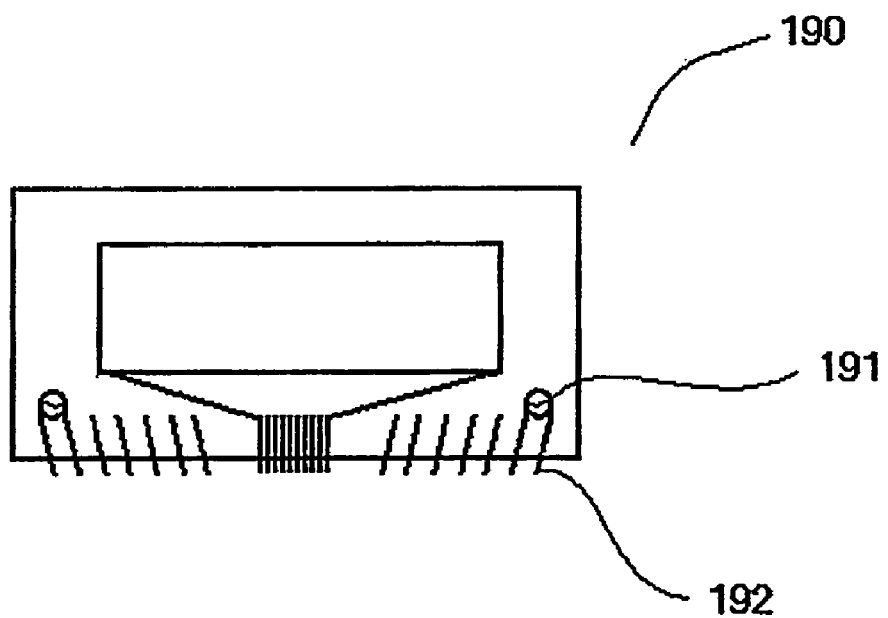

FIG. 19 shows a schematic view of a display panel 190 wherein the at least one active illumination element 191 is located proximate to the edge of the display panel whereat the interconnect lines 192 are extending outwardly. Essentially this embodiment provides that the lighting element will be substantially hidden from a viewer when these panels are used in a large display.

Tenth Preferred Embodiment

Figure 20:
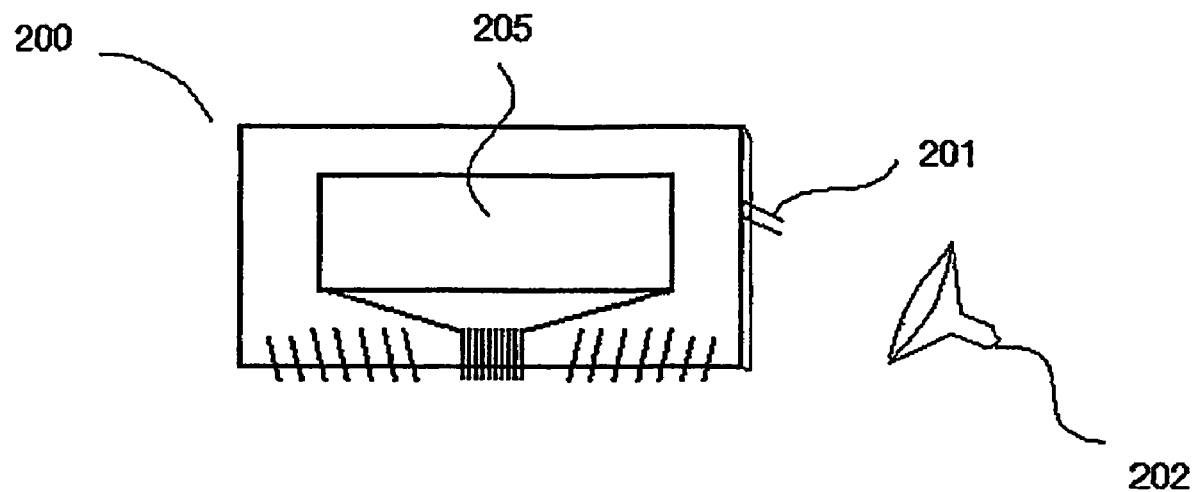

FIG. 20 shows a schematic view of a display panel 200 wherein at least one fiber optic interface 201 is located peripheral to the matrix 205 and each said at least one interface is for receiving light from a bright light source 202 (e.g. laser, arc lamp, or the likes) and for dispersing said light into the panel. Essentially this embodiment provides a means for lateral illumination through the plates (of glass or glass-like substrates). The key advantage here seems to be that a single high efficiency light source can be used. Nevertheless, with today's optical gating, the illumination level at each panel could also be controlled.

Eleventh Preferred Embodiment

Figure 21:
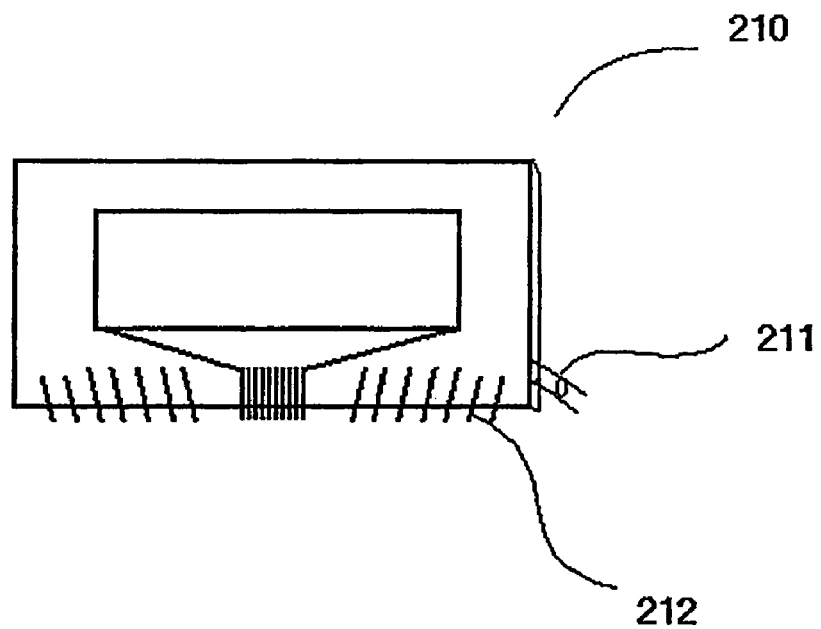

FIG. 21 shows a schematic view of a display panel 210 wherein the at least fiber optic interface 211 is located proximate to the edge of the display panel whereat the interconnect lines 212 are extending outwardly. As in the Ninth Preferred Embodiment, here too possible optical illumination or overflow will be substantially hidden from a viewer when these panels are used in a large display.

Twelfth Preferred Embodiment

Figure 22:
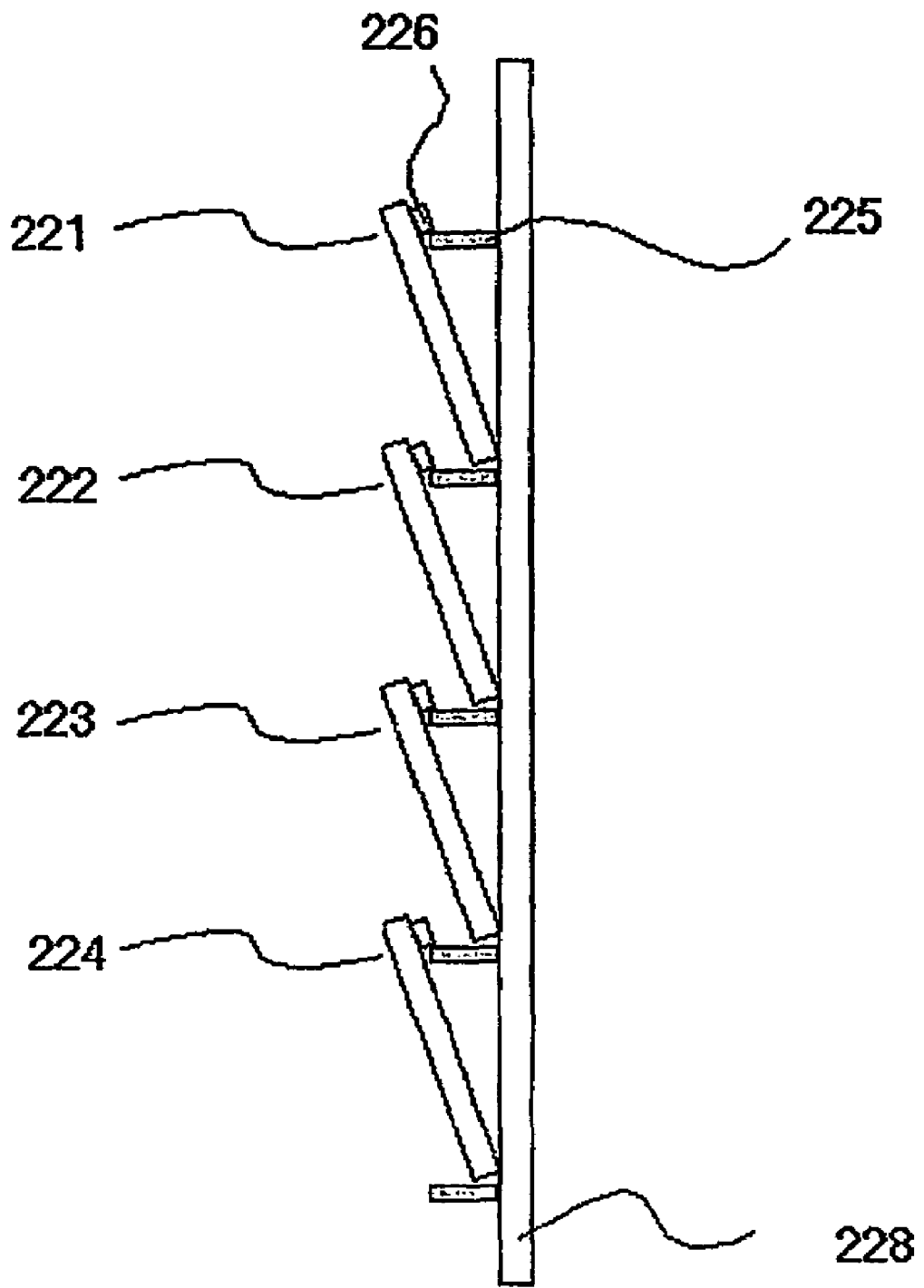
FIGS. 22-23 are respective schematic views of display panels (for use in a large display) according to the Twelfths and Thirteenth Preferred Embodiments.

FIG. 22 shows a schematic lateral view of display panels 221, 222, 223, 224 (preferably used in a large display made from a tiling of the individual panels) that are respectively held to a structural member 228 using at least one locking 226 support 225. Preferably, the structural member is selected from the list: beam, post, plate, grid, mesh, or the likes. Essentially, this provides a simple and facile modular basis for combining a large plurality of panels into a large display.

Thirteenth Preferred Embodiment

Figure 23:
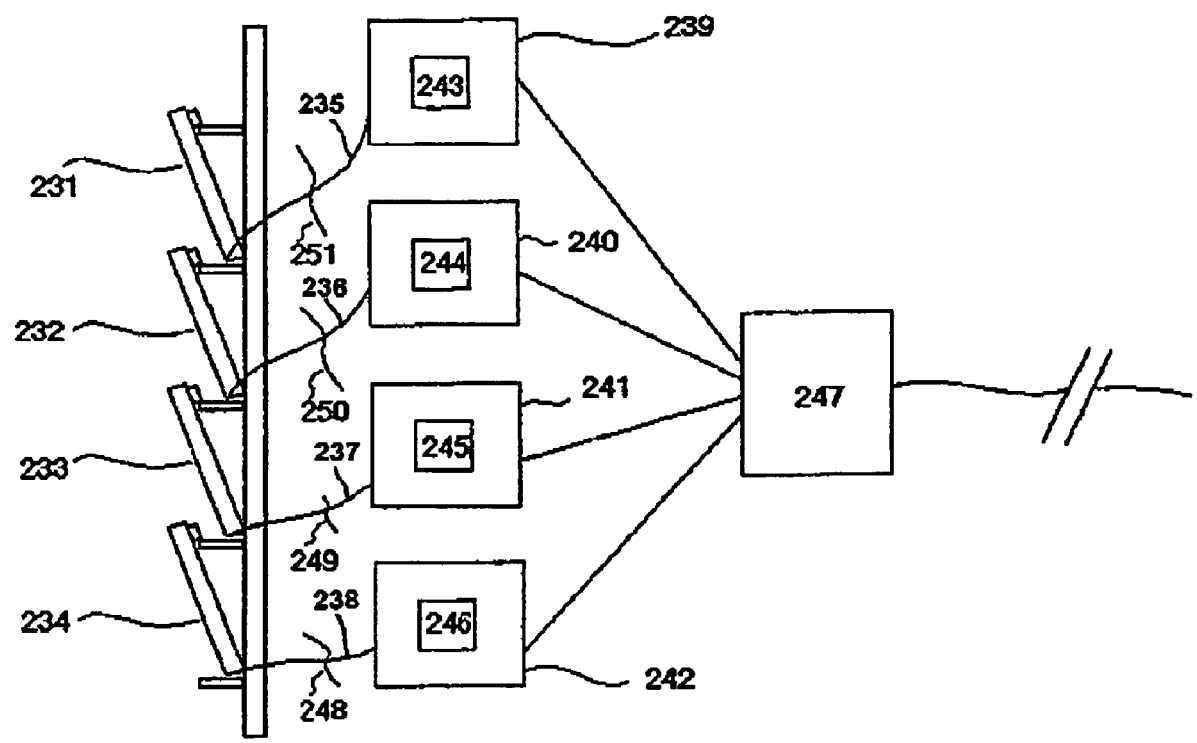

FIG. 23 shows a schematic lateral view of display panels 231, 232, 233, 234 (preferably used in a large display made from a tiling of the individual panels) wherein the outwardly extended interconnect lines 235, 236, 237, 238 of each panel respective interface with an electronics module 239, 240, 241, 242. Preferably, the electronics module includes software driven circuitry 243, 244, 245, 246 for driving a graphic pattern on the respective display panel. Furthermore, it is preferable that the electronics module includes at least one data-communications channel 247 with an external controller. In addition, the respective interface is preferably a detachable attachment 248, 249, 250, 251; albeit in certain circumstances an integrated plurality of display modules optionally uses the respective interface as an integral attachment. Essentially, these features may be combined with those of the Twelfth Preferred Embodiment to provide a large display that is both easy to install and easy to maintain.

While the invention has been shown and described in detail with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A display panel comprising:
   pixels arranged in a matrix in first and second directions;
   first interconnect lines connected to said pixels and extending in said first direction; and
   second interconnect lines connected to said pixels and extending in said second direction,
   wherein first input portions of said first interconnect lines are routed on an area of said display panel where a sealing portion is formed and are extended outwardly from an edge of said display panel from which second input portions of said second interconnect lines are extended outwardly, wherein said first input portions being routed a longer distance have greater line widths, and wherein said first input portions of successive first interconnect lines comprise first and second groups arranged alternatingly, said first group of said first input portions are routed on one side of said area where said sealing portion is formed, and said second group of first input portions are routed on an opposite side of said area where said sealing portion is formed.

2. The display panel according to claim 1, further comprising: first and second plates, wherein said first interconnect lines are formed on said first plate, and said second interconnect lines are formed on said second plate.

3. The display panel according to claim 1, wherein low resistance films are deposited on said first input portions.

4. The display panel according to claim 2, wherein each of said first input portions are routed along two routes, one on an area of said first plate where said sealing portion is formed and one on an area of said second plate where said sealing portion is formed.

5. The display panel according to claim 1, wherein at least one active illumination element is located peripheral to the matrix and each said at least one element having respective interconnect lines extending outwardly from the edge of the display panel.

6. The display panel according to claim 5, wherein the at least one active illumination element is located proximate to the edge of the display panel whereat the interconnect lines are extending outwardly.

7. The display panel according to claim 1, wherein at least one fiber optic interface is located peripheral to the matrix and each said at least one interface is for receiving light from a bright light source and for dispersing said light into the panel.

8. The display panel according to claim 7, wherein the at least fiber optic interface is located proximate to the edge of the display panel whereat the interconnect lines are extending outwardly.

9. A large display constructed by arranging display panels in a matrix, said display panels each comprising:

pixels arranged in a matrix in first and second directions;

first interconnect lines connected to said pixels and extending in said first direction; and second interconnect lines connected to said pixels and extending in said second direction, wherein first input portions of said first interconnect lines are routed on an area of said display panel where a sealing portion is formed and are extended outwardly from an edge of said display panel from which second input portions of said second interconnect lines are extended outwardly, wherein said first input portions being routed a longer distance have greater line widths, and wherein said first input portions respectively associated with successive first interconnect lines comprise first and second groups arranged alternatingly, said first group of first input portions are routed on one side of said area where said sealing portion is formed, and said second group of said first input portions are routed on an opposite side of said area where said sealing portion is formed.

10. The large display according to claim 9, wherein said display panels are arranged such that edges of said display panels from which said first and second input portions are extended outwardly overlap with other adjacent ones of said display panels.

11. The large display according to claim 10, wherein said display panels are respectively held to a structural member using at least one locking support.

12. The large display according to claim 11, wherein the structural member is selected from the list: beam, post, plate, grid, mesh.

13. The large display according to claim 9, wherein the outwardly extended interconnect lines of each panel respective interface with an electronics module.

14. The large display according to claim 13, wherein the respective interface is an integral attachment.

15. The large display according to claim 13, wherein the electronics module includes software driven circuitry for driving a graphic pattern on the respective display panel.

16. The large display according to claim 13, wherein the respective interface is a detachable attachment.

17. The large display according to claim 13, wherein the electronics module includes at least one data-communications channel with an external controller.

* * * * *